(12) United States Patent
Zappettini et al.

(10) Patent No.: US 7,099,069 B2
(45) Date of Patent: Aug. 29, 2006

(54) ELECTRO-OPTIC SEMICONDUCTOR MODULATORS

(75) Inventors: Andrea Zappettini, Reggio Emilia (IT); Silvia Maria Pietralunga, Cassina de Pecchi (IT); Enos Gombia, Reggio Emilia (IT)

(73) Assignee: Pirelli & C. S.p.A., Milan (IT)

( * ) Notice: Subject to any disclaimer, the term of this patent is extended or adjusted under 35 U.S.C. 154(b) by 76 days.

(21) Appl. No.: 10/498,868

(22) PCT Filed: Dec. 18, 2001

(86) PCT No.: PCT/EP01/14959

§ 371 (c)(1),
(2), (4) Date: Nov. 19, 2004

(87) PCT Pub. No.: WO03/052431

PCT Pub. Date: Jun. 26, 2003

(65) Prior Publication Data

US 2005/0083566 A1    Apr. 21, 2005

(51) Int. Cl.
*G02F 1/00* (2006.01)
*G02F 1/03* (2006.01)

(52) U.S. Cl. .................. 359/322; 359/248; 359/321

(58) Field of Classification Search ........... 359/248, 359/279, 321, 322
See application file for complete search history.

(56) References Cited

U.S. PATENT DOCUMENTS

| | | | |
|---|---|---|---|
| 3,446,966 A | 5/1969 | Peterson | 359/246 |
| 3,955,880 A | 5/1976 | Lierke | 359/291 |
| 5,248,885 A | 9/1993 | Sato et al. | 250/370.15 |

FOREIGN PATENT DOCUMENTS

| | | |
|---|---|---|
| JP | 11-174390 | 7/1999 |
| WO | WO 01/90811 A1 | 11/2001 |
| WO | WO 03/014811 A1 | 2/2003 |

OTHER PUBLICATIONS

Yasuo; "Photoelectric Field Measuring Apparatus"; Patent Abstracts of Japan, of JP 58-196463 A, Nov. 15, 1983.
Steier et al.; "Opto-Optical Switching in the Infrared Using CdTe"; Optics Letters, vol. 14, No. 4, pp. 224-226, (1989).
Milani et al.; "Characterization of Electro-Optic Shielding Effect in Bulk CdTe : in Crystals"; Journal of Crystal Growth, vol. 214/215, pp. 913-917, (2000).
Zappettini et al.; "High-Pressure Bridgman Grown CdZnTe for Electro-Optics Applications"; Journal of Electronic Materials, vol. 30, No. 6, pp. 743-747, (2001).
Sato et al.; "Local Polarization Phenomena in In-Doped CdTe X-Ray Detector Arrays"; IEEE Transactions on Nuclear Science, vol. 42, No. 5, pp. 1513-1518, (1995).

*Primary Examiner*—David N. Spector
(74) *Attorney, Agent, or Firm*—Finnegan, Henderson, Farabow, Garrett & Dunner, L.L.P.

(57) ABSTRACT

An electro-optic (EO) device having a high-resistivity semiconducting crystal and a method of operating such a device. The local shielding of the externally applied field lowers the EO effect, which can be partially or completely inhibited particularly in the low-frequency regime, i.e., less than about $10^5$ Hz. By holding a high-resistivity semiconducting crystal at a suitable temperature, EO response and efficiency are improved, in particular for light signals that are non-modulated or modulated at low frequencies. Preferably, the temperature at which the semiconducting crystal is held during functioning is between 50 and 150° C. Enhancement of the EO effect has been demonstrated also for EO devices operating at relatively large optical powers, i.e., larger than about 0.1 mW.

24 Claims, 12 Drawing Sheets fig. 1

ELECTRO-OPTIC SEMICONDUCTOR MODULATORS

CROSS REFERENCE TO RELATED APPLICATIONS

This application is a national phase application based on PCT/EP01/14959, filed Dec. 18, 2001, the content of which is incorporated herein by reference.

BACKGROUND OF THE INVENTION

1. Field of the Invention

The present invention relates to an electro-optic device and to a method of operating an electro-optic device.

2. Description of Related Art

Crystals that lack a centre of symmetry can show a linear electro-optic (EO) effect where the induced birefringence is linearly proportional to the applied electric field. The polarisation components of an optical beam propagating in such crystals have different phase velocities and thus produce a phase shift that depends on the intensity and orientation of the applied field. An application of the EO effect is in optical modulators, in which a signal-controlled EO crystal is used to modulate an optical beam.

Semiconducting high-resistivity crystals are attractive EO materials. High resistivity enables the crystal to sustain electric biasing fields with negligible power consumption, which represent a preferred condition for EO modulation. In this context, with high-resistivity semiconductors it is meant semiconducting materials with resistivity comprised between $10^7$ and $10^{12}$ Ωcm.

Among high-resistivity semiconducting materials, crystals with zinc-blende (cubic) crystalline structure have been widely studied. Because of their optical isotropy in the absence of an externally applied electric field, there is no need to apply a compensating biasing voltage or to add compensating birefringent waveplates on the optical path to achieve polarisation independence. Examples of zinc-blende EO crystals are GaAs, CdTe, ZnS-cubic, CdZnTe or ZnTe.

Another important class of high-resistivity semiconductors includes the crystals having hexagonal (wurtzite) structure, such as CdS, ZnS-wurtzite, CdSe or CdSSe.

CdTe and CdZnTe are well known as substrate materials for high-energy or infrared detectors.

CdTe-based radiation detectors may exhibit a poor stability due to a charge, or local, polarisation effect. Local polarisation, which is induced by applying a bias voltage to a detector or by irradiating with high photon fluence on a detector, causes a progressive decrease of counting rate and pulse height with time. Sato T. et al. in "*Local polarization phenomena in In-doped CdTe x-ray detector array*", IEEE Transactions on Nuclear Science, vol. 42, p. 1513 (1993), study the local polarisation phenomena in CdTe:In detector arrays. A temperature dependence of charge polarisation was observed and, as the detector temperature increased, the local polarisation phenomena tended to diminish. This result was said to indicate that the local polarisation phenomena resulted from ionisation of deep levels that induced the space charge. Since the raise of the detector temperature releases the trapped charges easily from the deep level, the polarisation phenomena tend to diminish with the rise of the detector temperature. U.S. Pat. No. 5,248,885 discloses a x-ray radiation detector formed with a compound semiconductor, such as CdTe or GaAs. During radiation detection, the detector can be heated at a suitable temperature or irradiated with infrared rays having an energy smaller than the bandgap of the semiconductor compound and larger than the energy of the trap level present in said compound in order to compensate for a reduction in the output of the detecting element occurring with a high-dose incidence.

Electro-optic modulators in lithium niobate (LiNbO$_3$), an insulating ferroelectric oxide material, are widely used in digital communication systems. Some optical applications using LiNbO$_3$ crystals are known to be hampered by the so-called optical damage, which leads to a localised light-induced change of the refractive index. For LiNbO$_3$, optical damage is mainly caused by the photorefractive effect. The damage process due to light exposure can occur gradually over days or hours, or, in case of high optical powers and short wavelengths, in seconds.

Japanese patent application No. 11-174390 describes a LiNbO$_3$-based optical modulator, which is heated at a temperature above room temperature to reduce the optical damage induced by a short-wavelength (e.g., 442 nm) light beam.

U.S. Pat. No. 3,446,966 discloses that a LiNbO$_3$-based optical modulator exhibits a significant EO effect when maintained at a temperature of at least 50° C.

The study of CdTe and, more recently, of CdZnTe for infrared light modulators has received ample interest in the past years. In U.S. Pat. No. 3,955,880, cadmium telluride is said to be a suitable material for infrared radiation modulators because of its high resistivity and of the limited absorption rate for infrared radiation. A CdTe-based module for optically activated switching of optical beams is described in "*Opto-optical switching in the infrared using CdTe*", by Steier W. H. et al., Optics Letters, vol. 14, p.224 (1989).

The EO effect is generally expressed by the EO or Pockels coefficients $r_{ij}$ of a third-rank tensor, where the first subscript refers to a tensor component of the index ellipsoid and the second to the electric field vector. The EO coefficients are characteristic parameters of each EO material and relate the applied electric field to the variation of birefringence induced by that electric field. For example, zinc-blende crystals belong to the $\bar{4}3$ m symmetry group that has three equal Pockels coefficients, i.e., $r_{41}=r_{52}=r_{63}$.

Very often, an EO material is characterised by means of the figure of merit. For a zinc-blende crystalline structure, the figure of merit is equal to the product of the electro-optic factor $r_{41}$ and the third power of the refraction index $n_0$ for the ordinary ray, namely $r_{41}n_0^3$. For an hexagonal crystalline structure of the 6 mm group symmetry, such as that of CdS, the figure of merit is given by $r_{13}-(n_0/n_e)^3 r_{33}$, where $n_e$ is the refractive index for the extraordinary ray.

A light beam transmitted across an EO crystal alters its state of polarisation when voltage is applied to the crystal by causing a phase retardation between orthogonal polarisation components of the beam. The relative phase retardation, Γ, is given by the following expression, $$\Gamma = \frac{2\pi}{\lambda}\Delta n L, \quad (1)$$

where Δn is the electrically induced birefringence (the difference in refractive index for the two polarisations of light), which is proportional to the applied electric field, L is the crystal length and λ the wavelength of light that is being used.

Free-charge carriers, photoexcited by the unavoidable absorption of light from the incoming beam, result in a volume space-charge distribution that locally shields the externally applied field: This mechanism lowers the Pockels effect, which can be partially or completely inhibited at certain optical intensities. A possible explanation of this phenomenon is the formation of space-charge regions in the bulk of the material, due to carrier photogeneration from intra-gap levels.

Milani et al. in "*Characterization of electro-optic shielding effect in bulk CdTe:In crystals*", Journal of Crystal Growth, vol. 214/215, p. 913 (2000), describe measurements on CdTe:In. The EO actual figure of merit was observed to decrease with the decrease of the modulation frequency for frequencies below a certain threshold value, or cut-off frequency, that depended on the incident optical power. Measurements were carried out for samples at 300 K (room temperature) and at 80 K. The cut-off frequency was seen to lower by a decade in passing from 300 K to 80 K. The authors concluded that loss in EO yield could be minimised by a suitable reduction in operating temperature and sample dimensions, having defined the optical power of the signal to be processed.

In "*High-pressure Bridgman grown CdZnTe for electro-optic applications*" by Zappettini et al., Journal of Electronic Materials, vol. 30, p. 743 (2001), hereafter referred to as Zappettini's article, the decrease of the figure of merit with the increase of optical beam intensity is reported for a $Cd_{0.9}Zn_{0.1}Te$ sample; A decrease of the figure of merit with the increase of beam power was observed for a modulation frequency of 1 Hz, reaching a 25% reduction at an incident optical power $P_{in}$=1 mW. Measurements on the $Cd_{0.9}Zn_{0.1}Te$ crystal are compared to measurements on a CdTe:In sample. For optical beams at a wavelength of 1530 nm and frequencies of less than 100 Hz, the value of figure of merit for CdTe:In decreases, whereas the performance of $Cd_{0.9}Zn_{0.1}Te$ does not substantially change at low frequencies. CdZnTe was used as basic material to implement a 2×2 EO switch operating on free-space propagating signals.

WO 01/90811 describes more in detail a CdZnTe-based EO switch. The EO switch, for infrared light modulation, includes $Cd_xZn_{1-x}Te$, where the Cd molar fraction x is between 0.7 and 0.99.

Applicants have observed a strong reduction at low frequencies of the figure of merit of high-resistivity semiconductors when the wavelength of the optical beam that passes through the crystal is of 1300 nm or smaller, even if the incident optical power is low, for instance of 0.1 mW. Applicants have found that this may lead to degradation in optical modulation at low-frequency EO modulation or switching, e.g., in quasi-static switches for use in optical cross-connects.

SUMMARY OF THE INVENTION

Applicants have found that by holding an EO high-resistivity semiconducting crystal at a suitable temperature EO response and efficiency are improved, in particular for light signals that are unmodulated or modulated at low frequencies.

In one aspect, the invention relates to an EO device comprising
- a high-resistivity semiconducting crystal with resistivity in the range $10^7$–$10^{12}$ Ωcm, said crystal having an input end and an output end;
- at least a pair of electrodes provided on at least one surface of the semiconducting crystal;
- means for providing an optical beam directed to the input end of the crystal having a wavelength in the range 1000 to 1650 nm;
- a voltage source to provide an electric field between said electrodes, and
- a heater in thermal contact with the crystal for maintaining the crystal at a desired operating temperature.

Preferably, the temperature at which the semiconducting crystal is held during functioning, i.e., the operating temperature, is comprised between 50 and 150° C. More preferably, the operating temperature is comprised between 80 and 120° and most preferably is comprised between 100 and 120° C.

In a preferred embodiment, the EO high-resistivity semiconducting crystal belongs to the zinc-blende crystal class. In a more preferred embodiment, the EO zinc-blende crystal comprises $Cd_xZn_{1-x}Te$, in particular with x of 0.7 to 1.0.

In another preferred embodiment, the EO high-resistivity semiconducting crystal belongs to the wurtzite crystal class.

In still another preferred embodiment, an EO device comprises a polariser in the output path of the optical beam exiting from the crystal.

In a further preferred embodiment, an EO device comprises a polariser in the input path of the optical beam entering the crystal.

In a still further preferred embodiment, a polarisation retarder includes the EO device.

In a preferred embodiment, the modulating frequencies of the incoming optical beam are set from 0 Hz, i.e., unmodulated beam, to about $10^5$ Hz.

In another aspect, the invention relates to a method of processing an optical beam with an electrical signal, said method comprising the steps of:
- providing a high-resistivity semiconducting crystal with resistivity in the range $10^7$–$10^{12}$ Ωcm, said crystal having an input end and an output end;
- directing an optical beam having a wavelength in the range 1000 to 1650 nm to the input end of the crystal;
- applying a voltage to the crystal so as to induce an electric field in the crystal, and
- maintaining the crystal at an operating temperature comprised between 50° C. and 150° C.

These and other objects, aspects, features, and advantages of the invention will become apparent from the following description and from the claims. While the following description is often specific, the specifics should not be viewed as limitations on the scope of the invention. The above description should only be regarded as an exemplification of embodiments of the invention.

DETAILED DESCRIPTION

Figure 1:
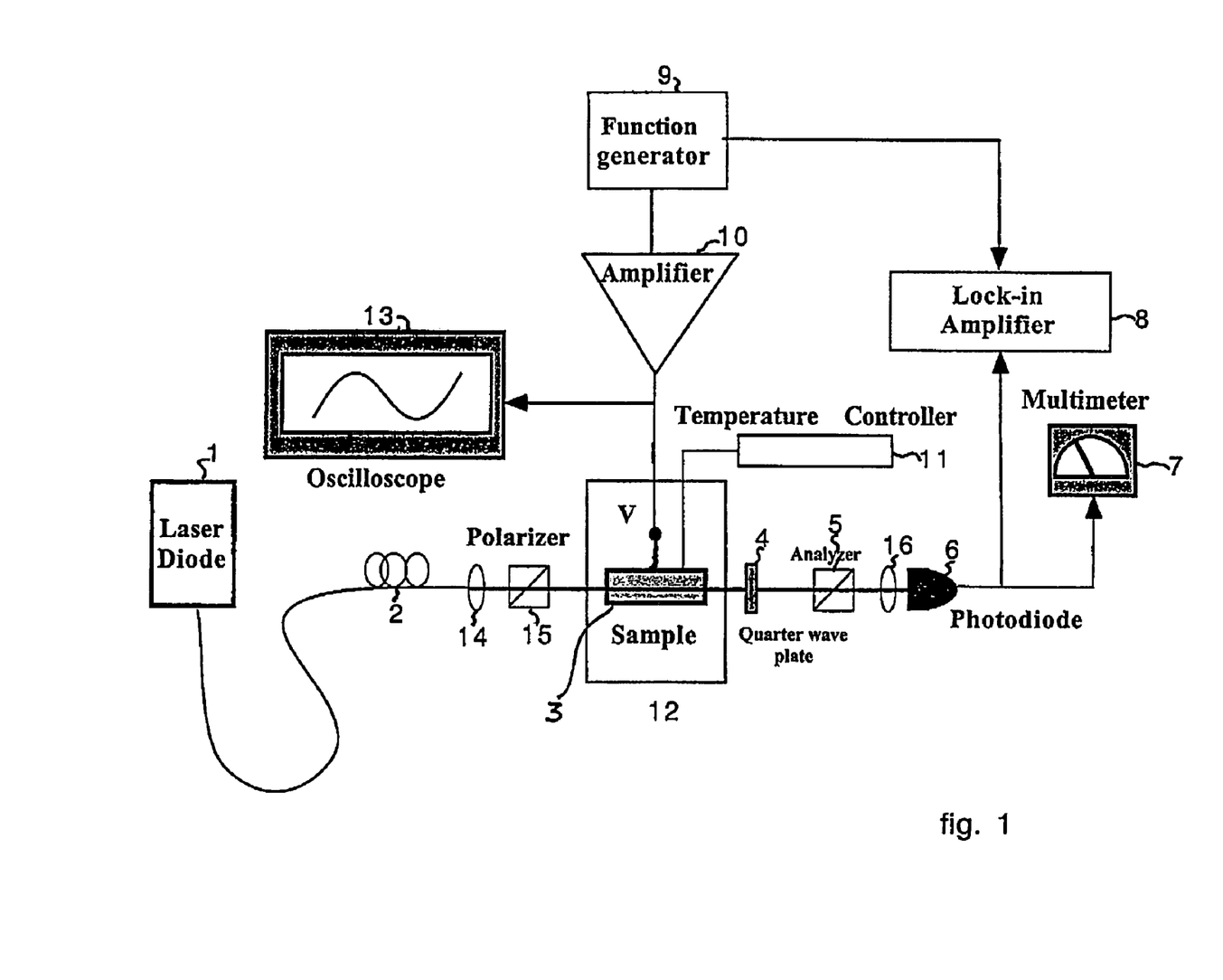
FIG. 1 is a schematic representation of the experimental set-up for the measurements of the electro-optic modulators.

Experiments were carded out on different electro-optic crystals using a system of the type shown in FIG. 1. A solid-state laser or a laser diode 1 has an output coupled to a single-mode fibre, which is connected to a conventional polariser 2. Polariser 2 comprises a plurality of optical fiber coils which are suitably stressed, disposed in succession and supported so that they can be oriented with respect to a common axis of alignment to provide the desired polarization control. The optical beam emitted from laser 1 passes through the polariser 2, is optically coupled to a conventional collimating lens 14 and enters a linear polariser 15 to finally impinge the input end of an EO crystal 3. A function generator 9 produces the electric field to be applied to crystal sample 3. The function generator used in the following examples was model 5100A made by Krohn (MA, USA), which could produce a modulated electric voltage from DC to frequencies up to 3 MHz with an amplitude of a few volts. An amplifier 10 is used to amplify the electric signal signal generated by function generator 9. In this example, a Krohn Hite 7602M amplifier, which can reach the maximum amplitude of 400 $V_{pp}$ (voltage peak-to-peak), was used. The generated voltage is monitored by oscilloscope 13. Polarised light emerges from the output end face of the EO crystal body 3 and passes through a quarter-wave plate 4 and a polarisation analyser 5, i.e., a linear polariser. A focussing lens 16 is positioned between the polarisation analyser 5 and a photodiode 6. In the experiments of the following examples the photodiode 6 was an InGaAs photodiode made by New Focus (USA), No. 1811, having a bandwidth of 125 MHz Polariser 15 is used to select the vertical or the horizontal optical beam polarization forming an angle of 45° to the electrically-induced optical axes of the crystal sample 3. A lock-in amplifier 8 is connected to photodiode 6 and to function generator 9. In the measuring system of the example, the lock-in amplifier was a Stanford-SR830 DSP, CA (USA). The photodiode is connected to a multimeter 7.

Although in the system of FIG. 1 the optical beam directed to the EO is generated by a laser and carried by a single-mode optical fibre, clearly other means for providing the, optical beam can be contemplated. For instance, the optical beam can be carried by and emerge from an optical fibre as the result of remote generation or amplification. Alternatively, the optical beam can be generated by a laser and focussed by a lens placed between the laser and the crystal.

Figure 2:
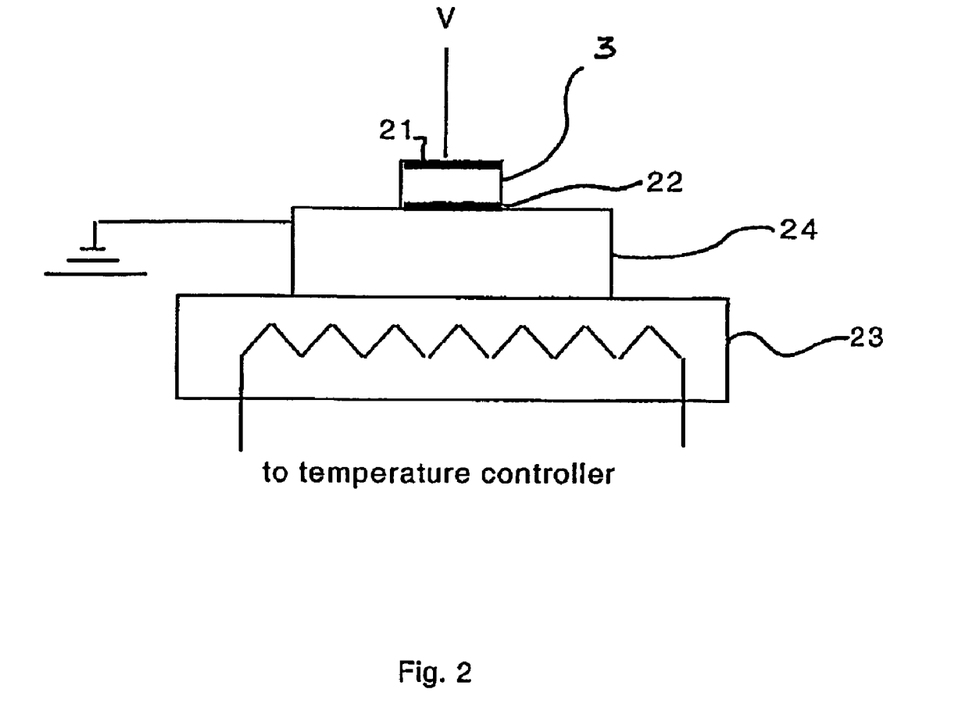
FIG. 2 shows a heating apparatus for an electro-optic crystal sample according to an embodiment of the present invention.

The EO crystal 3 is heated by using a conventional thermal apparatus referred in FIG. 1 with number 12, possibly provided with a temperature controller 11. An example of thermal apparatus is shown in FIG. 2. The EO crystal 3 is provided with electrodes 21 and 22. Electrodes can be made of any suitable conductive material, such as Au or In. The bottom electrode is attached, for instance with silver paste, on an Al ground block 24. The Al ground block is interposed to ensure temperature and mechanical stability. The ground block contacts a conventional ceramic heater 23. The ceramic heater may comprise a temperature controller, such as a thermocouple. Although a ceramic heater is used in this example, the thermal apparatus used to maintain the crystal at a certain suitable temperature is not limited to any particular type. For example, the crystal can be heated by using resistance heaters or be indirectly heated, e.g., by hot air flow.

Although in the particular example described in FIG. 2, the semiconducting crystal is provided with the electrodes placed on two opposed surfaces of the crystal, electrodes may be differently positioned on the crystal surfaces or may have different shape. For instance, the EO crystal may be provided with a pair of planar or interdigitated electrodes along one of the crystal surfaces. This configuration can be advantageous particularly in case of EO crystal having one or more integrated optical waveguides placed beneath the surface that is provided with the electrodes.

The generator 9 produces a voltage which is a sinusoidal function of amplitude $V_a$ and angular frequency $\omega$. The electric signal detects by photodiode 6 is demodulated in frequency and phase by the lock-in amplifier 8. Lock-in demodulation offers a good signal to noise ratio and a good sensitivity in the measurements. The multimeter 7 reads the output average voltage $V_{OUT}$ of the detected signal, while the lock-in amplifier 8 reads the peak-to-peak amplitude $\Delta V_{OUT}$ of the modulation induced by the EO effect.

EO crystals of the following examples were of parallelepiped shape with squared area d×d and length L in the direction of the optical beam.

The actual figure of merit $M_{eff}$ was determined as a function of frequency and of optical power, using the following relation $$M_{eff} = \frac{\lambda d}{2\pi L} \frac{\Delta V_{OUT}}{V_{OUT}\Delta V_{IN}}\bigg|_{\Delta V \to 0.} \quad (2)$$

where $\Delta V_{IN}=2V_a$ is the peak-to-peak amplitude of the modulating voltage applied to the crystal, $\Delta V_{OUT}$ is the output voltage signal around the mean point $V_{OUT}$, $\lambda$ is the beam wavelength, and d and L are the dimensions of the crystal. The actual figure of merit $M_{eff}$ expresses the Pockels response due to the effective electric field within the volume of the modulating crystal. By spanning the modulating frequency from 0 Hz, i.e., direct current (DC), up to 3 MHz, the $M_{eff}$ frequency behaviour was obtained.

EXAMPLE 1

Figure 3:
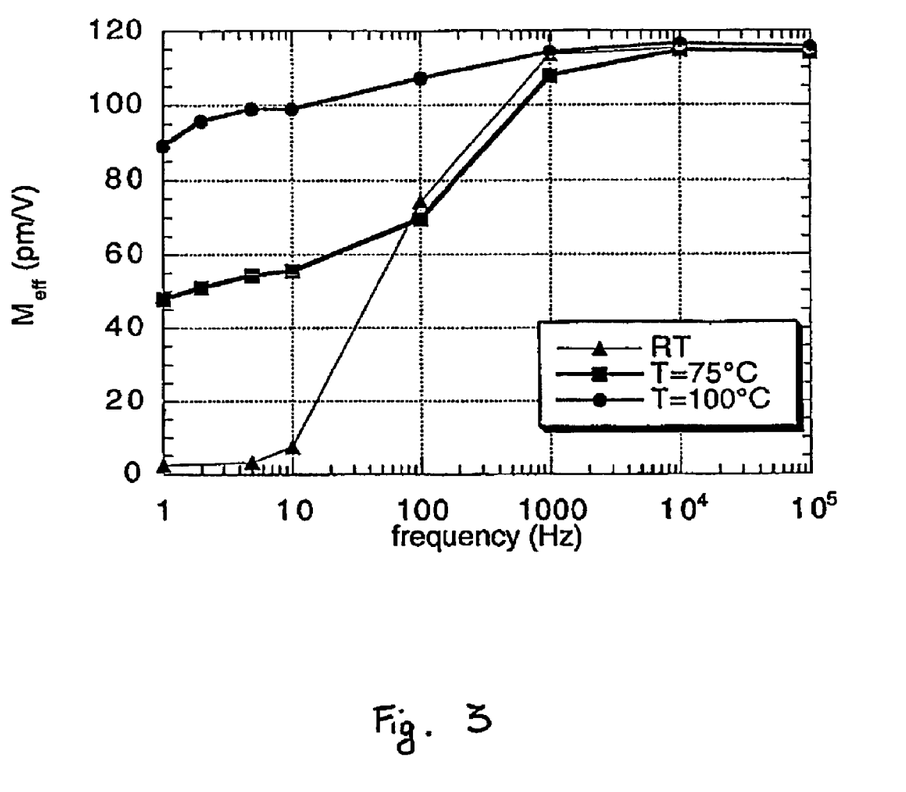
FIG. 3 shows the actual figure of merit vs. modulation frequency at different sample temperatures for an optical beam of optical power of 100 μW and 1530 nm wavelength on a $Cd_{0.9}Zn_{0.1}Te$:In crystal.
Figure 4:
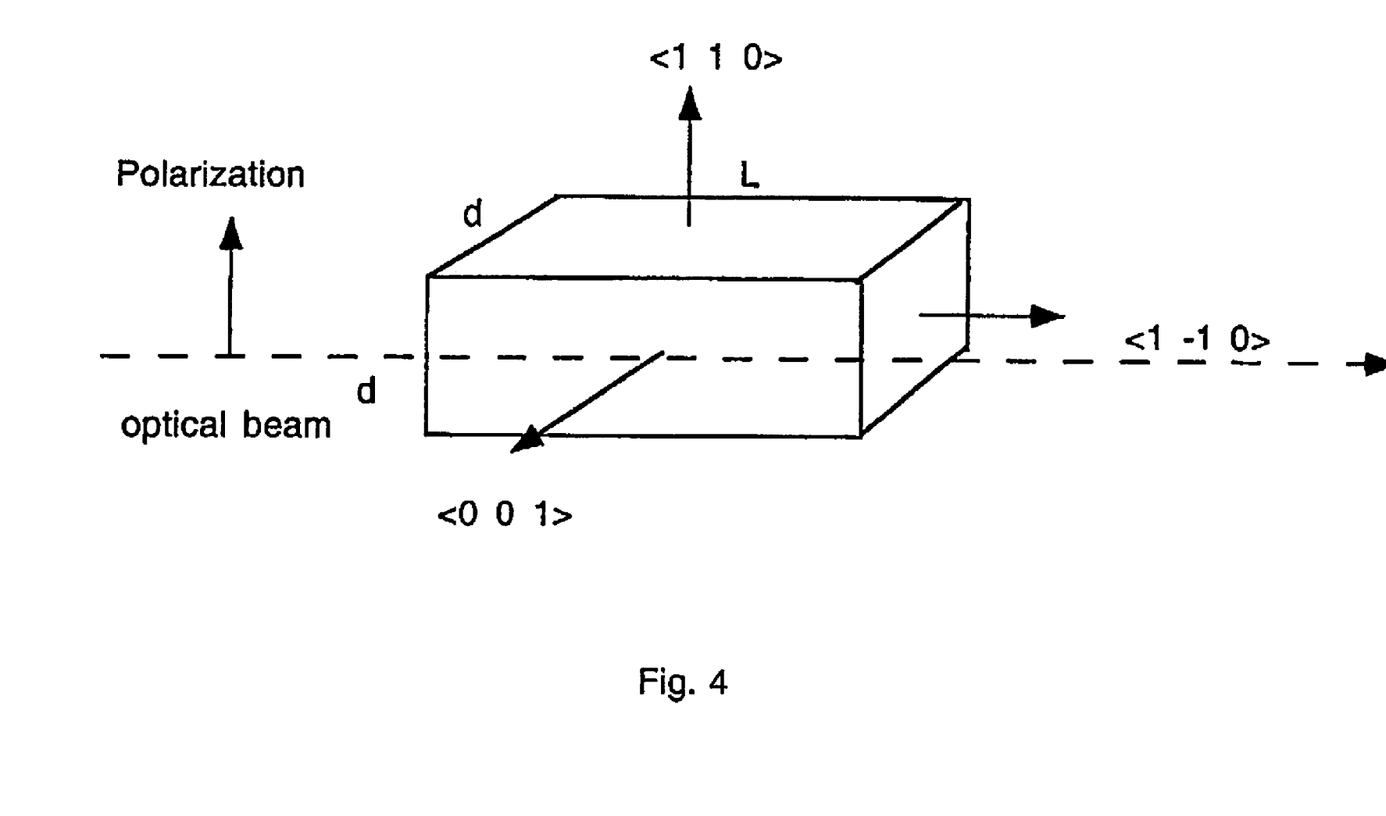
FIG. 4 is a schematic drawing of the geometry a polarised light beam incident on an AM-cut zinc-blende crystal.

FIG. 3 displays the figure of merit $M_{eff}$ as a function of the modulating frequency for a $Cd_{0.9}Zn_{0.1}Te:In$ crystal, a commercial sample from IMARAD Imaging Systems, Ldt. (Israel) of base dimensions $2\times2$ mm$^2$ and length L of 10 mm. The $Cd_{0.9}Zn_{0.1}Te:In$, of zinc-blende crystalline structure, had a resistivity of $3\times10^9$ Ωcm. The optical beam propagated along the crystallographic axis <1-10>, while the electric field was applied along the perpendicular axis <110>, as schematically illustrated in FIG. 4. This configuration is generally named AM (amplitude modulation) cut. In this example, the two surfaces d×d represent the input and the output ends of the crystal.

The crystal behaves like a birefringent plate and induces a phase retardation on the optical beam. Equation (1) becomes:

$$\Gamma = \frac{2\pi}{\lambda} n_0^3 r_{41} \frac{L}{d} V (MKS), \quad (3)$$

where $\lambda$ is the optical wavelength, $n_0$ the refractive index, $r_{41}$ the Pockels coefficient, L the geometrical path in the crystal, d the inter-electrode spacing (i.e., the sample thickness), and V the applied voltage. When the input optical beam is linearly polarised at 45° to the birefringence axes, the applied voltage will produce a variable phase delay between the ordinary and extraordinary field components, simulating a voltage-tunable plate. If a polariser is placed after the EO crystal, the transmitted intensity is periodically modulated according to $$T_{\parallel} = \cos^2(\Gamma/2) = \cos^2\left(\frac{\pi}{\lambda} n_0 r_{41} \frac{L}{d} V\right) \quad (4)$$

$$T_{\perp} = \sin^2(\Gamma/2) = \sin^2\left(\frac{\pi}{\lambda} n_0 r_{41} \frac{L}{d} V\right)$$

with $T_{\parallel}$ the intensity that would be transmitted through a parallel polariser and $T_{\perp}$ the intensity that would be transmitted through a crossed polariser. In case the polariser is a polarisation beam splitter (PBS), Eq. (4) describes a simultaneous transmission of the two outputs of the PBS. In this way, by varying the applied voltage V, spatial switching of the transmitted power between two output channels could be obtained.

For the special case when the retardation $\Gamma$ is $\pi$, which is the half-wave retardation value, the polarisation of the transmitted light is rotated by 90° C. The half-voltage $V_\pi$ is:

$$V_\pi = \frac{\lambda}{2} \frac{1}{r_{41} n_0^3} \frac{d}{L}. \quad (5)$$

Results of FIG. 3 are shown for an incident beam linearly polarised along the <110> direction of the crystal, as shown in FIG. 4. The incident beam had a wavelength of 1530 nm and optical power of 100 μW. The voltage applied to the crystal $\Delta V_{IN}$ had an amplitude $V_a$ of 100 V. Curves are shown for three different operating temperatures at which the sample was held during measurements: room temperature (RT), corresponding to about 22° C., 75° C. and 100° C.

At RT, there is a systematic reduction of $M_{eff}$ with the decrease of frequency for frequencies below about $10^3$ Hz. Holding the crystal at 75° C. leads to an increase of the figure of merit by about a factor of 10 at frequencies smaller than 10 Hz. With the decrease of the modulation frequency, the figure of merit exhibits a decrease of only about 25% when heating the sample at 100° C. For instance, at 1 Hz, $M \cong 1$ pm/v at RT, whereas $M \cong 84$ pm/V for the sample heated at 100° C.

EXAMPLE 2

Figure 5:
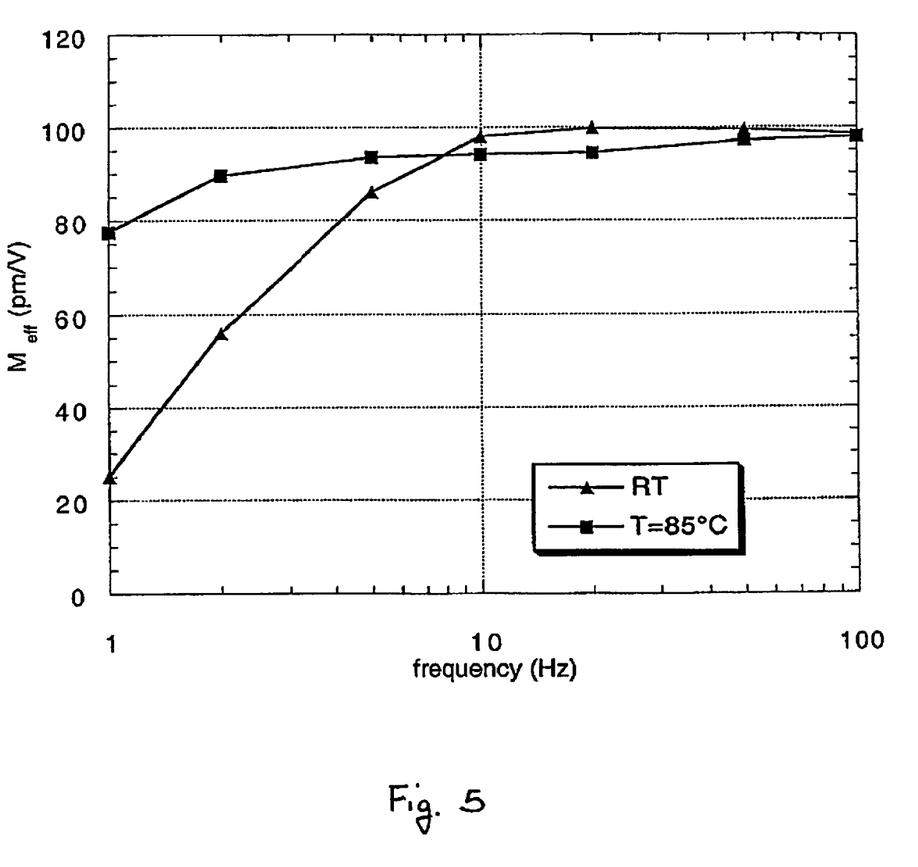
FIG. 5 shows the actual figure of merit vs. modulation frequency for an optical beam of optical power of 100 μW and 1530 nm wavelength on a CdTe:In crystal at RT and at 85° C.

FIG. 5 displays the figure of merit $M_{eff}$ vs. modulating frequency both at room temperature and at 85° C. for a commercial CdTe:In crystal from II-VI incorporated (PA, USA) of 10 mm length and 2×2 mm$^2$ base surface. The resistivity of the CdTe:In sample was of the order of $10^9$ Ωcm. Experimental conditions, such as optical beam power, beam wavelength and sample orientation, were the same as those described in the first example. The curve of the figure of merit relative to the crystal held at 85° C. remains nearly constant with the decrease of frequency. At 1 Hz, the value of the figure of merit has decreased of only less than 10% with respect to the values at higher frequencies and is about a factor of 3 larger than the figure of merit for the crystal at RT.

EXAMPLE 3

Figure 6:
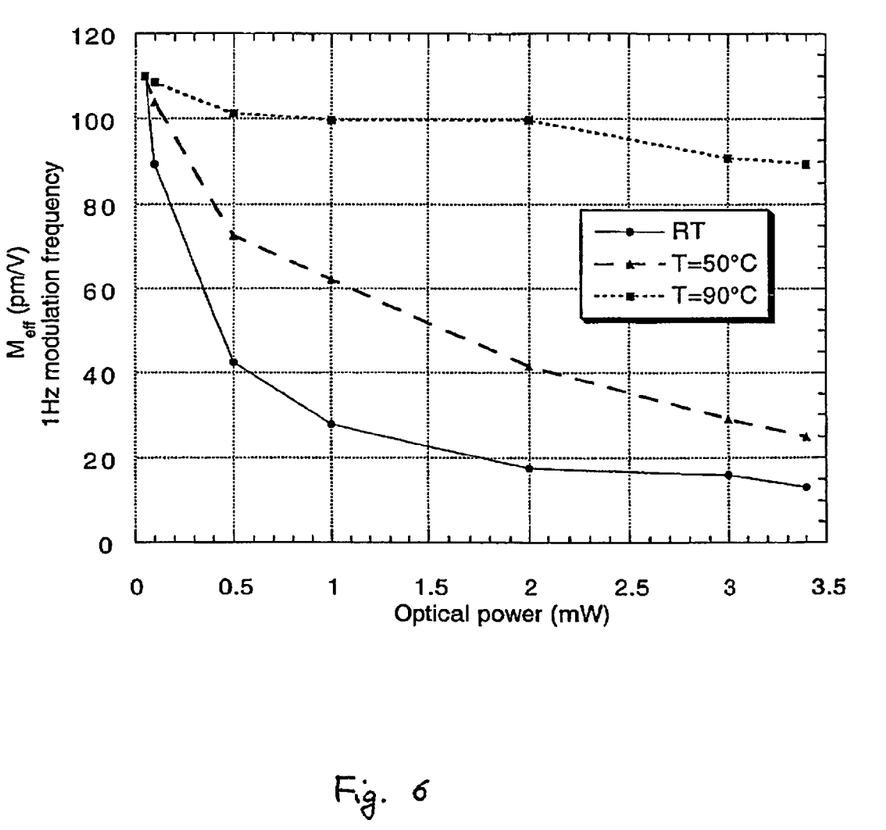
FIG. 6 shows the actual figure of merit vs. optical power at different sample temperatures for an optical beam of 1530 nm wavelength on a $Cd_{0.9}Zn_{0.1}Te$ crystal. Modulation frequency was set at 1 Hz.

In FIG. 6 the figure of merit $M_{eff}$ for an undoped $Cd_{0.9}Zn_{0.1}Te$ crystal is displayed as a function of the incident beam intensity for different crystal temperatures. The sample, manufactured by II-VI Incorporated, exhibited a resistivity of the order of $10^{10}$ Ωcm. Experimental conditions were the same as those described in the first example. During measurements, the modulation frequency was set to 1 Hz. For the non-heated crystal, i.e., at RT, the figure of merit sharply decreases already with optical power larger than 0.1 mW. At 3.4 mW, the value of $M_{eff}$ was reduced by more than a factor 7 with respect to the initial value corresponding to an optical power of 0.1 mW. Heating the $Cd_{0.9}Zn_{0.1}Te$ crystal at 50° C. smoothes the $M_{eff}$ reduction. For instance, at 2 mW, the value of $M_{eff}$ for T=50° C. is about a factor of two larger than that for the RT crystal. When the crystal is held at 90° C., the figure of merit remains essentially constant up to and including 2 mW and exhibits a relatively small decrease with the increase of power. Results are particularly remarkable if we consider that the non-heated $Cd_{0.9}Zn_{0.1}Te$ crystal probed with an incident beam of 0.1 mW at 1530 nm did not exhibit a reduction of the figure of merit at low frequencies, as shown in Zappettini's article. This indicates that heating an EO semiconducting crystal at a temperature of 50° C. or more improves the characteristics even of the good-quality samples that are less affected by the reduction of the Pockels coefficient at low modulation frequencies. This invention becomes thus particularly advantageous in EO devices that operate with optical beams having relatively high optical powers.

EXAMPLE 4

Figure 7:
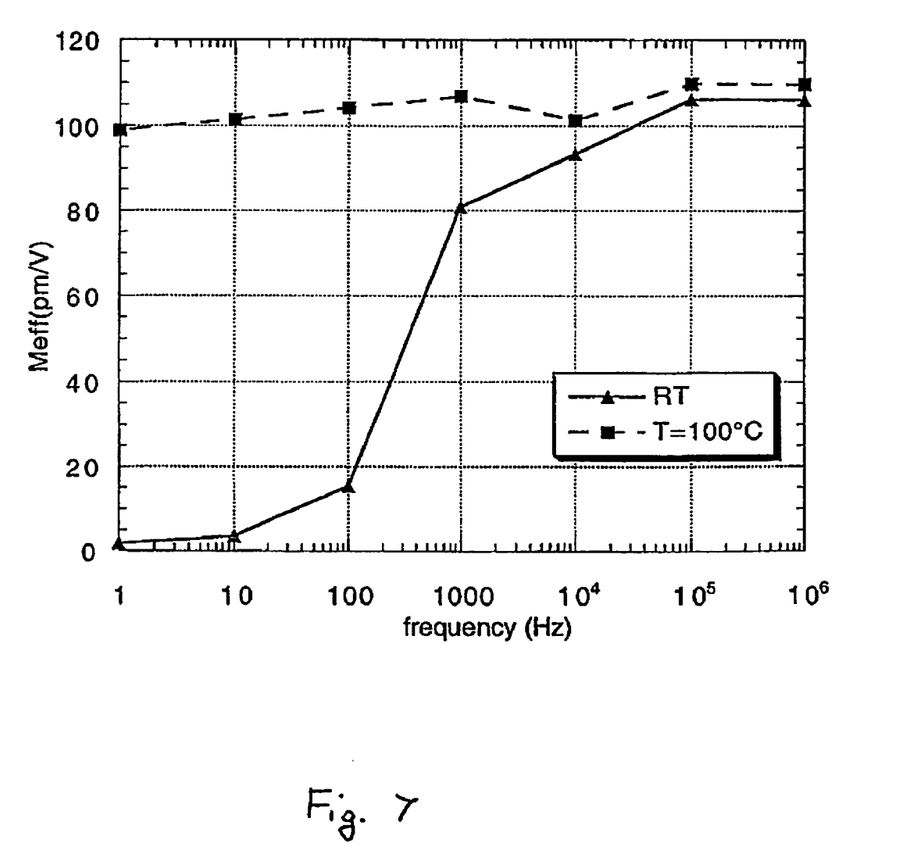
FIG. 7 shows the actual figure of merit vs. modulation frequency for an optical beam of optical power of 100 µW and 1300 nm wavelength on a $Cd_{0.9}Zn_{0.1}Te$ crystal at RT and at 100° C.

FIG. 7 reports the figure of merit vs. modulation frequency for the $Cd_{0.9}Zn_{0.1}Te$ crystal of example 3, measured at RT and at 100° C. Experimental conditions were the same as those of example 3, but for the wavelength of the incoming beam, which was 1300 nm in the present example.

Figure 8:
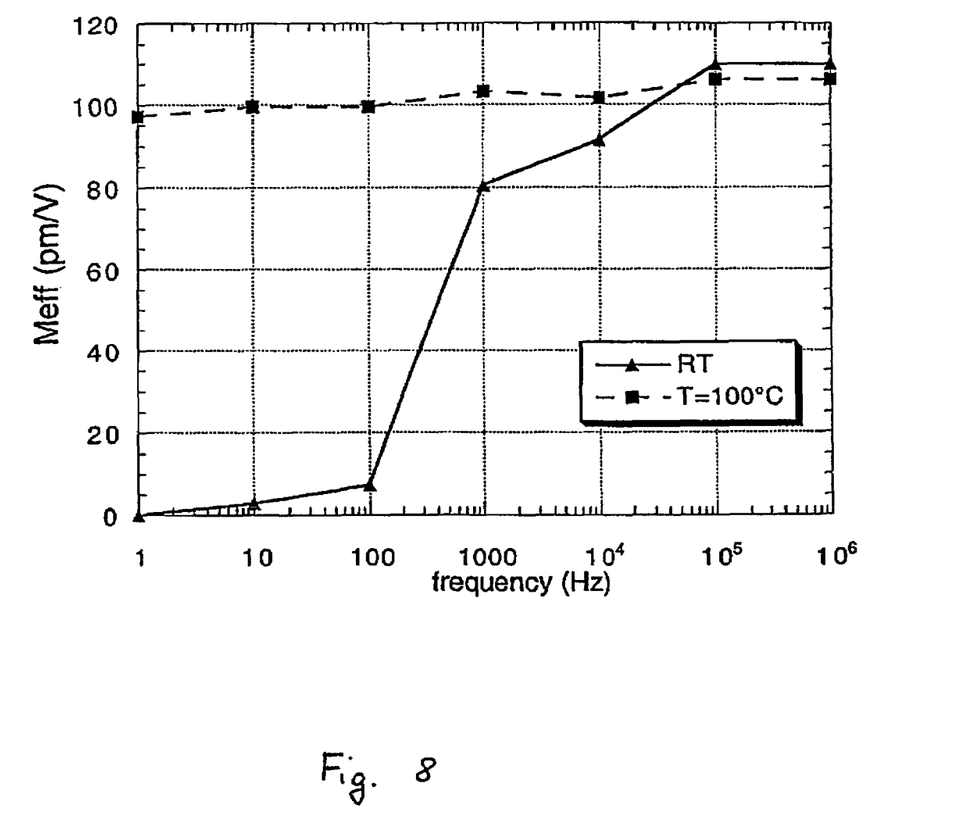
FIG. 8 shows the actual figure of merit vs. modulation frequency for an optical beam of optical power of 100 µW and 1064 nm wavelength on a $Cd_{0.9}Zn_{0.1}Te$ crystal at RT and at 100° C.

In FIG. 8 the wavelength of the incident optical beam was again different and set to 1064 nm (optical power was always 100 µW). Both figures show a decrease in the $M_{eff}$ value with decreasing frequency for the non-heated crystal, i.e., at RT. When the crystal is held at 100° C., the figure of merit remains substantially independent of frequency in the range $1-10^6$ Hz. The good performance of the EO crystal at incident wavelengths in the second window, i.e., around 1300 nm, or lower (down to 1064 nm) is particularly relevant, especially if we consider that at these low wavelengths photogeneration and thus the local shielding effect becomes more detrimental.

EXAMPLE 5

Figure 9:
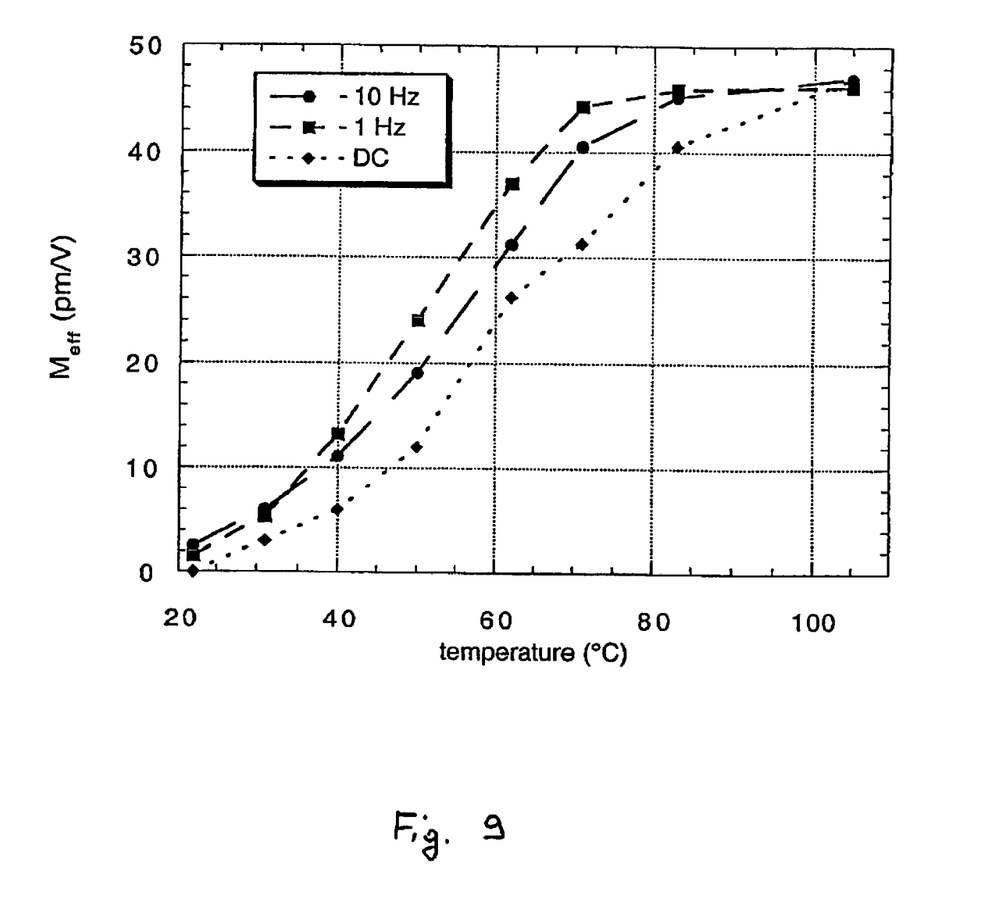
FIG. 9 displays the actual figure of merit as a function of the heating temperature for a GaAs crystal for an incident optical beam of 100 µW and 1530 nm wavelength at direct current (DC), 1 Hz and 10 Hz.

FIG. 9 refers to the figure of merit measurements on an undoped GaAs crystal, grown at the MASPEC-CNR Institute (Parma, IT). The GaAs sample had a resistivity of $7 \times 10^7$ Ωcm and was impinged by an optical beam at 1530 nm with 100 µW of optical power. The figure of merit $M_{eff}$ on the GaAs crystal is reported as a function of the heating temperature. Measurements were made at three different modulation frequencies: 0 Hz (DC), 1 and 10 Hz with an optical beam at 1530 nm and 100 µW of optical power. An increase of the figure of merit is visible at all temperatures above RT. At 50° C., the value of $M_{eff}$ becomes 25–50% of the high-frequency value. The three curves approach the high-frequency value when the GaAs crystal is heated above about 80° C. We remark that at 105° C. the three curves converge upon the value of 46±2 pm/V, typical value of GaAs for the high-frequency regime.

EXAMPLE 6

Figure 10:
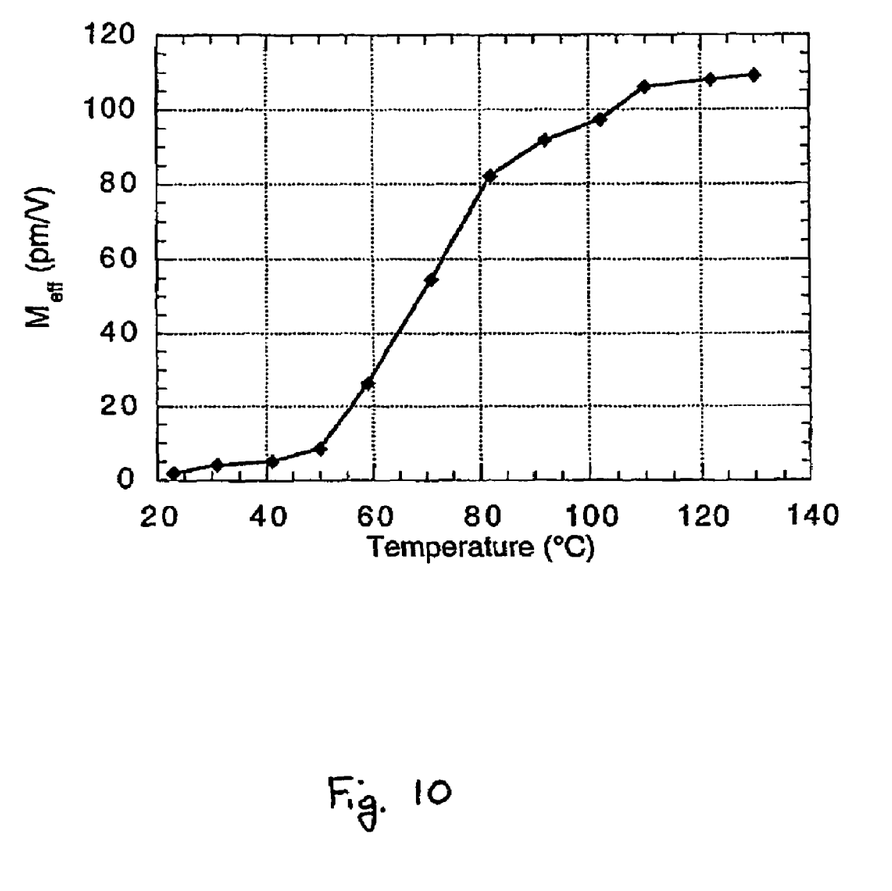
FIG. 10 shows the actual figure of merit as a function of the heating temperature for a $Cd_{0.9}Zn_{0.1}Te:In$ crystal traversed for an incident optical beam of 100 µW and 1530 nm wavelength at direct current (DC), 1 Hz and 10 Hz.

FIG. 10 shows the figure of merit vs. the heating temperature for the $Cd_{0.9}Zn_{0.1}Te$:In crystal of Example 1 probed by an unmodulated optical beam (DC voltage). The value of $M_{eff}$ approaches the theoretical limit at temperatures larger than about 100° C.

EXAMPLE 7

Figure 11:
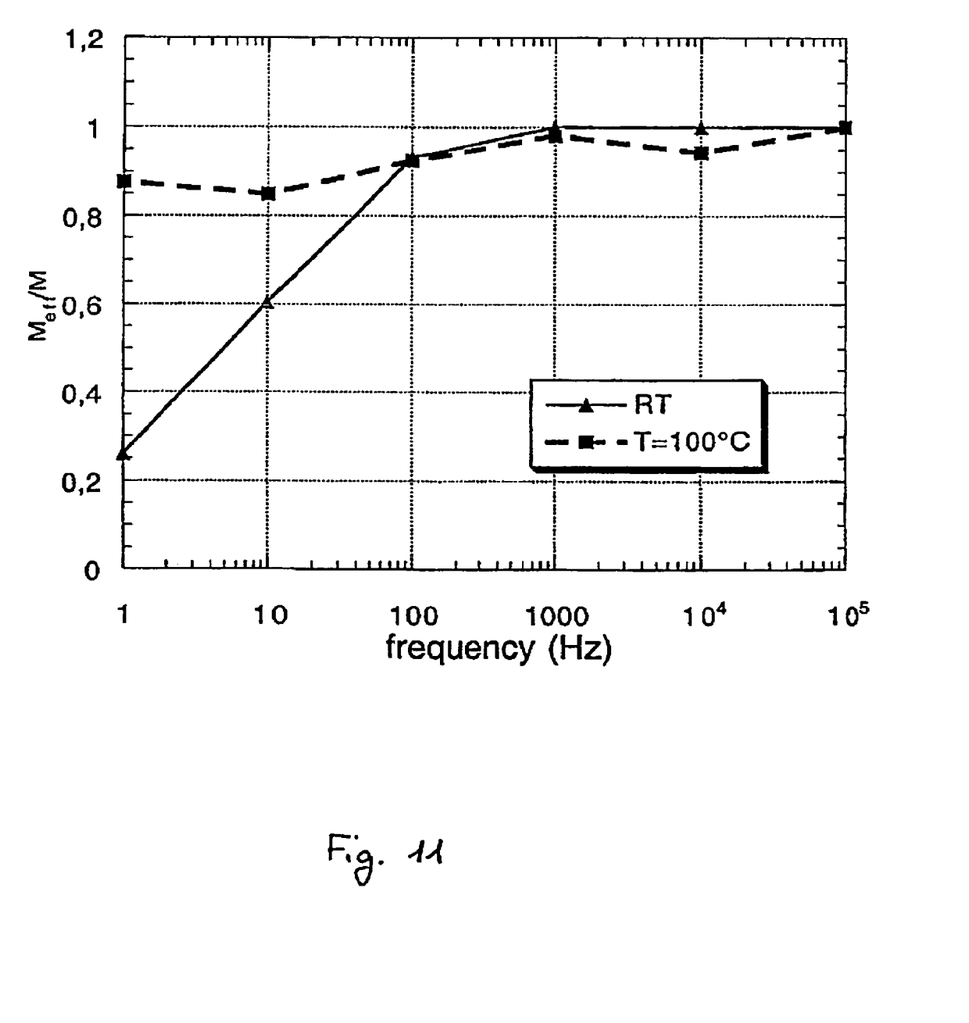
FIG. 11 shows the actual figure of merit vs. modulation frequency for an optical beam of optical power of 100 µW and 1530 nm wavelength on a CdS crystal at RT and at 100° C.

FIG. 11 shows the figure of merit $M_{eff}$ as a function of the modulation frequencies measured on a AM-cut CdS crystal at RT and at 100° C. The reported figure of merit is normalised to the high-frequency value M. The incident optical beam was emitted by a Nd:YAG laser at a wavelength of 1064 nm and beam intensity of 100 µW. Also in this case, the increase of the figure of merit at low frequencies due to crystal heating is clearly observed.

Although examples have been made with particular reference to the system of FIG. 1, results obviously extend to any optical modulation device or system that comprises an EO high-resistivity semiconducting crystal. Optical modulation devices include phase, polarisation, or intensity modulators, beam recombiners, beam splitters or Mach-Zender interferometers. The present invention is particularly advantageous for optical modulation at relatively low frequencies, i.e., from 0 Hz (direct current) to about $10^5$ Hz, or for relatively high optical powers, i.e., larger than about 0.1 mW.

Figure 12:
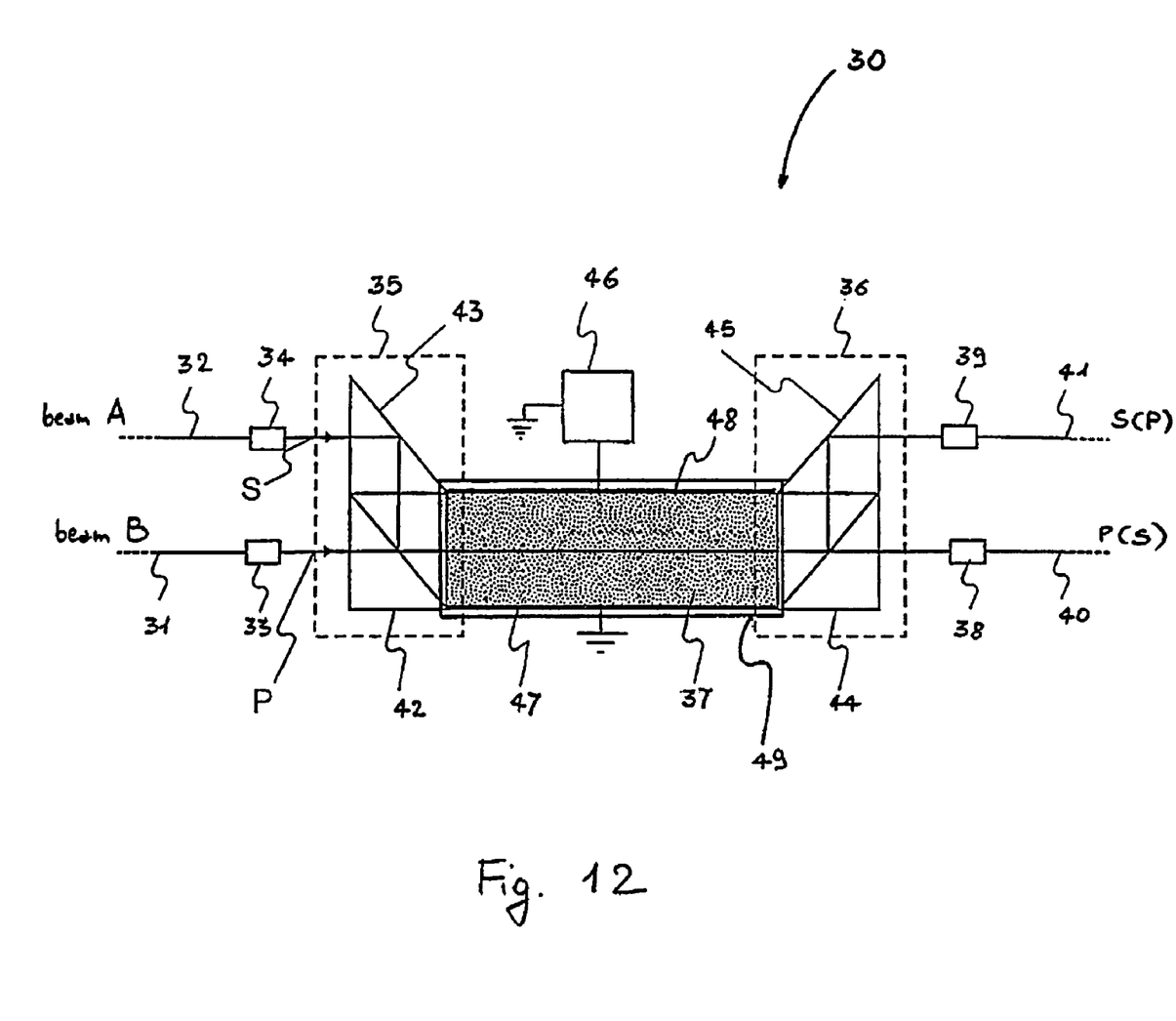
FIG. 12 shows a bidirectional 2×2 cross-bar switch for optical communication signals according to an embodiment of the present invention.

The present invention may find suitable applications virtually in any EO device that comprises a high-resistivity semiconductor. For example, the invention can be applied to an infrared EO switch of the type described in WO 01/90811. FIG. 12 shows the schematic representation of a bidirectional 2×2 cross-bar switch 30 for optical communication signals. The electro-optical switch 30 can operate at optical signals having wavelengths in the 1510–1610 nm wavelength range, which corresponds to the so-called "third window" of optical communication, or in the 1300–1350 nm range ("second window"). In general, the electro-optical switch can employ optical signals having wavelengths in the 1000–1650 nm range.

Referring to FIG. 12, first and second input optical fibres 31 and 32 transmit optical signals to and from the switch via first and second collimators 33 and 34. Switch 30 also includes optical elements 35 and 36, an EO crystalline body 37, third and fourth collimators 38 and 39, first and second output optical fibres 40 and 41. Optical element 35 comprises a first polarisation beam splitter (PBS) 42 and a conventional right-angle reflecting prism 43. The second optical element 36 comprises a second PBS 44 and a second conventional right-angle prism 45.

The EO crystalline body comprises a high-resistivity semiconducting crystal. In a preferred embodiment, the crystal comprises a zinc-blende crystal or a wurtzite crystal as basic material. In a more preferred embodiment, the EO crystal comprises $Cd_xZn_{1-x}Te$, where the Cd molar fraction x lies between 0.7 and 1.0. In another preferred embodiment, the inter-electrode distance d is between 200 µm and 2 mm.

A typical operation of the EO switch 30 is described. An optical signal indicated as "beam A" with linear state of polarisation "S" passes through the first input optical fiber 32 to collimator 34. Right-angle reflecting prism 43 reflects the collimated signal S to PBS 42, which is oriented so as to project the state of polarisation S of beam A at 45° with the EO-induced birefringent axes of crystal 37.

An amplified voltage V is applied across the crystal element 37 to electrodes 48 and 49 by a switching control unit 46. Crystal element 37, arranged in the AM-cut configuration, is heated at a suitable operating temperature by means of a thermal apparatus schematically represented by enclosure 49. Preferably, the crystal is heated at a temperature comprised between 50 and 150° C. More preferably, the crystal is heated at a temperature between 80 and 120° C., most preferably at a temperature between 100 and 110° C.

In absence of an applied field (i.e., V=0), no polarisation rotation is induced. This configuration is usually referred to as the BAR state, where the input ports 31 and 32 are connected to output ports 40 and 41, respectively. If a voltage $V=V_\pi$ is applied to the crystal from switching control unit 46, the linear state of polarisation is rotated by 90°. In this way, signal S is converted by crystal 37 into a signal P having a linear state of polarisation orthogonal to the state S. The signal P is transmitted by second PBS 44 to second output port 40. This configuration that results in an exchange of the output port is usually referred to as the CROSS state. The device 30 is polarisation dependent because its operation requires that the incoming signals at the corresponding inputs have a linear state of polarisation S or P.

Alternatively, the present invention can be applied to bidirectional polarisation-insensitive optical switches, i.e., a switch that can operate independently of the polarization of the control light signal.

According to the present invention, switches may operate virtually at any switching frequency f and any wavelength in the 1000–1650 nm wavelength region without suffering from a deterioration in the EO efficiency. Furthermore, the switches can operate with good performances with relatively large optical powers, i.e., larger than about 0.1 mW.

Still another application of the present invention can be in polarisation controllers, which are devices for the control and/or stabilisation of the state of polarisation of an optical beam. The control of the state of polarisation is necessary whenever polarisation-dependent devices are used in optical communication systems. For instance, the polarisation control is needed, before a polatisation-dependent optical switch or modulator, such as wave-guided optical devices. In EP application No. 2001306683, a system for controlling the state of polarisation of an optical beam is described. Such a system comprises two polarisation retarders that produce a birefringence with fixed eigenstates and controllable phase retardation.

According to the present invention, a high-resistivity semiconducting crystal can be used in a polarisation retarder, said crystal being held at a suitable operating temperature, preferably comprised between 50 and 150° C. More preferably, the polarisation retarder comprises a zinc-blende crystal as EO material. Good device performances can be achieved even at relatively high optical powers, i.e., up to a few milliwatts, and at low modulation frequencies, i.e., lower than about $10^6$ Hz. Furthermore, it is possible to improve the behaviour of a polarisation controller in a broad infrared wavelength range, that is from about 1000 to 1650 nm.

It will be clear to those skilled in the art that various modifications and adaptations can be made to the present invention without departing from the spirit and scope of this invention, which is defined by the following claims.

What is claimed is:

1. An electro-optic device comprising
   a highly-resistivity semiconducting crystal with resistivity in the range $10^7$–$10^{12}$ Ωcm, said crystal having an input end and an output end;
   at least a pair of electrodes provided on at least one surface of the semiconducting crystal;
   means for providing an optical beam directed to the input end of the crystal, said beam having a wavelength in the range 1000 to 1650 nm;
   a voltage source to provide an electric field between said electrodes, and a heater in thermal contact with the crystal for maintaining the crystal at a desired operating temperature.

2. The electro-optic device of claim 1, wherein the heater is operable to maintain the crystal at a temperature within the range from 50° C. to 150° C.

3. The electro-optic device of claim 2, wherein the heater is operable to maintain the crystal at a temperature within the range from 80° C. to 120° C.

4. The electro-optic device of claim 2, wherein the heater is operable to maintain the crystal at a temperature within the range from 100° C. to 120° C.

5. The electro-optic device of claim 1, wherein the high-resistivity semiconducting crystal has a zinc-blende crystalline structure.

6. The electro-optic device of claim 5, wherein the high-resistivity semiconducting crystal comprises $Cd_xZn_{1-x}Te$.

7. The electro-optic device of claim 6, wherein x ranges from 0.7 to 1.

8. The electro-optic device of claim 1, wherein the high-resistivity semiconducting crystal has a wurtzite crystalline structure.

9. The electro-optic device of claim 1, wherein the electric field has a modulating frequency between 0 and $10^5$ Hz.

10. The electro-optic device according to claim 1, further comprising a polarizer disposed in an output path of the optical beam exiting from the crystal.

11. The electro-optic device according to claim 1, further comprising a polarizer disposed in an input path of the optical beam entering the crystal.

12. A method of processing an optical beam with an electrical signal, said method comprising the steps of:
    providing a high-resistivity semiconducting crystal with resistivity in the range $10^7$–$10^{12}$ Ωcm, said crystal having an input end and an output end;
    directing an optical beam having a wavelength in the range 1000 to 1650 nm to the input end of the crystal;
    applying a voltage to the crystal so as to induce an electric field in the crystal, and
    maintaining the crystal at an operating temperature between 50° C. and 150° C.

13. The method of claim 12, wherein the operating temperature is between 80° C. and 120° C.

14. The method of claim 13, wherein the operating temperature is between 100° C. and 120° C.

15. The method of claim 12, wherein the optical beam directed to the input end of the crystal has a modulating frequency between 0 and $10^5$ Hz.

16. A polarisation retarder having an electro-optic device comprising:
    a highly-resistivity semiconducting crystal with resistivity in the range $10^7$–$10^{12}$ Ωcm, said crystal having an input end and an output end;
    at least a pair of electrodes provided on at least one surface of the semiconducting crystal;
    means for providing an optical beam directed to the input end of the crystal, said beam having a wavelength in the range 1000 to 1650 nm;
    a voltage source to provide an electric field between said electrodes, and a heater in thermal contact with the crystal for maintaining the crystal at a desired operating temperature.

17. The polarisation retarder according to claim 16, wherein the heater is operable to maintain the crystal at a temperature within the range from 50° C. to 150° C.

18. The polarisation retarder according to claim 16, wherein the high-resistivity semiconducting crystal has a zinc-blende crystalline structure.

19. The polarisation retarder according to claim 18, wherein the high-resistivity semiconducting crystal comprises $Cd_xZn_{1-x}Te$.

20. The polarisation retarder of claim 19, wherein x ranges from 0.7 to 1.

21. The polarisation retarder of claim 16, wherein the high-resistivity semiconducting crystal has a wurtzite crystalline structure.

22. The polarisation retarder of claim 16, wherein the electric field has a modulating frequency between 0 and $10^5$ Hz.

23. The polarisation retarder of claim 16, further comprising a polariser disposed in an output path of the optical beam exiting from the crystal.

24. The polarisation retarder of claim 16, further comprising a polariser disposed in an input path of the optical beam entering the crystal.

* * * * *